United States Patent [19]
Grabscheid

[11] Patent Number: 6,068,582
[45] Date of Patent: May 30, 2000

[54] ROLL SHELL SUPPORT

[75] Inventor: Joachim Grabscheid, Heuchlingen, Germany

[73] Assignee: Voith Sulzer Papiermaschinen GmbH, Germany

[21] Appl. No.: 09/114,741

[22] Filed: Jul. 13, 1998

[30] Foreign Application Priority Data

Jul. 12, 1997 [DE] Germany .................. 197 29 907

[51] Int. Cl.$^7$ ............................................. B23P 15/00
[52] U.S. Cl. ............................ 492/16; 492/57; 492/60
[58] Field of Search ........................ 492/16, 57, 60

[56] References Cited

U.S. PATENT DOCUMENTS

| | | |
|---|---|---|
| 1,775,392 | 9/1930 | Gray . |
| 1,868,860 | 7/1932 | Von Reis . |
| 2,187,250 | 1/1940 | Sendzimiz . |

FOREIGN PATENT DOCUMENTS

| | | |
|---|---|---|
| 45777 | 5/1972 | Finland . |
| 14574 | 1/1881 | Germany . |
| 234738 | 7/1909 | Germany . |
| 815589 | 12/1961 | Germany . |
| 584256 | 9/1963 | Germany . |
| 1883014 | 11/1963 | Germany . |
| 1894949 | 6/1964 | Germany . |
| 7507905 | 12/1975 | Germany . |
| 2211892 | 2/1978 | Germany . |
| 2316746 | 8/1978 | Germany . |
| 3637206 | 9/1996 | Germany . |
| 388 | of 1881 | United Kingdom . |
| 2099105 | 12/1982 | United Kingdom . |
| 2186662 | 8/1987 | United Kingdom . |
| 2186661 | 9/1987 | United Kingdom . |

*Primary Examiner*—Irene Cuda
*Attorney, Agent, or Firm*—Ostrolenk, Faber, Gerb & Soffen, LLP

[57] ABSTRACT

A roll for use in a paper machine including a bendable roll shell disposed around a continuous roll carrier. The roll shell is supported at least in the radial direction on the roll carrier only in an axial central region. Axially outside the central region, the roll shell and/or carrier are respectively shaped and positioned that there is radial spacing between them for allowing the roll shell to bend in relation to the roll carrier under the weight of the roll shell and the force exerted by the belt, web, or the like, partially wrapped around the roll shell. To improve the behavior of the roll, the roll shell is of such material and/or shaped so that beginning from the central region, the rigidity of the roll shell decreases toward the axial ends of the roll shell in such a way that loading resulting from the dead weight of the roll shell and the operational loading on the roll shell causes desired curvature of the bending line of the roll shell. The roll shell may be affixed to rotate with the carrier or rotatable with respect to the carrier. The rigidity adjustment of the roll shell is obtainable either by varying the wall thickness of the roll shell and/or by selective inclusion of reinforcement materials within the roll shell for affecting the rigidity.

19 Claims, 1 Drawing Sheet

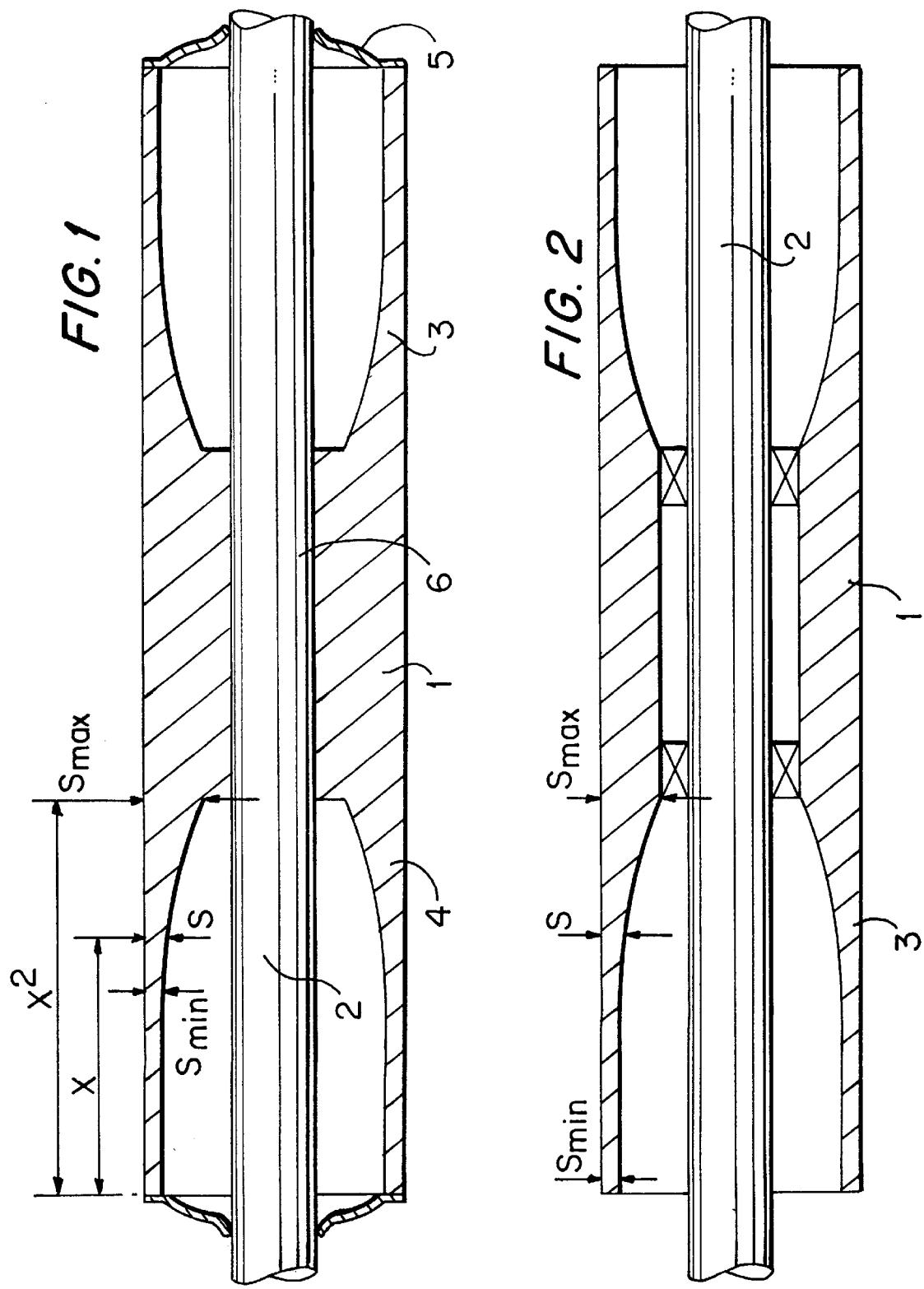

ROLL SHELL SUPPORT

BACKGROUND OF THE INVENTION

The present invention relates to a roll for use in a paper machine and particularly to support for the tubular roll shell. The roll hereof, comprises a roll tube or shell which is supported, at least in the radial direction, on a continuous roll carrier wherein the support is provided only in an axially central region. Axially outside this central region, the roll shell is spaced from the roll carrier, which allows the roll shell to bend in relation to the roll carrier inside it.

Rolls of this type are used particularly as guide rolls for felts, wires, fabrics, fibrous webs, sheeting, and the like elements of a paper machine and the web produced thereon.

Bending of the roll shell is intended to cause stretching or compressing, acting transversely in relation to the web running direction, of the material web that extends along the length of the roll and that wraps around a circumferential part of the roll. The type of action, i.e., stretching or compression, depends on the type of bending, i.e., concave or convex, of that region of the roll around which the web is wrapped.

Rolls of this type are described in German Utility Model 296 13 795 and U.S. Pat. No. 4,856,159. However, they have a disadvantage that the stretching or compressing action on the material web decreases toward the ends of the roll tube.

SUMMARY OF THE INVENTION

It is the object of the invention to improve the bending behavior of such rolls and their roll shell, away from their central regions.

In the invention, beginning from the axially central region, the rigidity of the roll tube decreases toward the ends of the roll tube such that the loading of the roll as a result of the dead weight of the roll shell and the external operational loading, cause a curvature of the bending line of the roll shell that is as constant as possible. Because the curvature of the bending line of the roll shell is as constant as possible, this also evens out the action on the material web.

The rigidity of the roll shell may be influenced particularly by its wall thickness. Depending on the length of the roll shell and the rigidity of its material, it is intended that beginning from the end of the central region and moving axially outward, the wall thickness of the roll shell should decrease, preferably continuously, either as far as the axial ends of the roll shell or else at least in a transition region. After the transition region, the wall thickness should remain as constant as possible out to the ends of the roll shell.

A particularly constant curvature of the bending line is obtained if the wall thickness between the maximum wall thickness at the end of the central region and a minimum wall thickness axially outward, which value is the lowest permissible value for the strength of the roll shell, is at most $$(x/x^*)^2 \cdot s_{max},$$

where x is the distance between the point to be considered, having the wall thickness s, and the end of the roll shell, x* is the distance between the end of the central region and the end of the roll shell, $s_{max}$ is the maximum wall thickness.

In addition and/or in the alternative, however, the rigidity of the roll shell may be influenced by additional parts disposed in the roll shell. This may include, for example, a supporting framework. However, if the roll shell is comprised of plastic, its rigidity can be influenced by reinforcements made of fibers, woven fabrics, or the like that are incorporated in the plastic around the circumference of the roll. However it is reinforced, the degree of reinforcement should decrease from the outer ends of the central region toward the axial ends of the roll shell. In this case, combination of the additional parts in the roll shell with reduction in the wall thickness toward the shell ends may be advantageous.

In the central region, the roll may be rotatably mounted on the roll carrier to rotate around the relatively stationary carrier e.g., by bearings at their respective central regions. Alternatively the roll shell may be firmly connected to the roll carrier so that they rotate together. In the latter case, it is possible to rotatably mount the roll carrier in a roll frame.

To counteract any contamination of the space between the roll shell and the roll carrier axially outside the central region, the roll shell may have a flexible covering radially toward the roll carrier.

Other objects, features and advantages of the present invention will become apparent from the following description of the invention which refers to the accompanying drawings.

BRIEF DESCRIPTION OF THE DRAWINGS

FIG. 1 is a schematic cross-sectional view showing a roll embodiment with a fixed connection between the roll shell 3 and the roll carrier 2, and FIG. 2 is schematic cross-sectional view showing a second roll embodiment with a rotatably mounted roll shell 3.

DESCRIPTION OF THE PREFERRED EMBODIMENTS OF INVENTION

In both embodiments, the roll comprises a roll shell or tube 3 which is supported, at least in the radial direction, on a continuous roll carrier 2 but only in an axially central region 1 of the shell. The carrier may be a rigid shaft, although it may be slightly deflectable when a load is applied to the shell.

Axially outside its central region 1, the shell is radially spaced from the roll carrier 2 to allow the roll shell 3 to bend in relation to the roll carrier 2. In this case, beginning from the axial ends of the central region 1, the rigidity of the roll shell 3 decreases toward the axial ends of the roll shell 3 in such a way that the loading as a result of the dead weight of the roll shell 3, combined with the external operational loading caused by whatever the roll is supporting or guiding in whatever direction that force may be applied, cause curvature of the bending line of the roll shell 3 that is as constant as possible. The external loading generally originates from a belt, which wraps around a circumferential part of the roll and the belt is in the form of wire, felt, sheeting, fibrous web, or the like which is supported or guided by a roll in a paper machine. Depending on whether the wrap region around the roll shell leads into the concave or convex circumferential region of the bent roll shell 3, the desired stretching or compressing of the supported or guided belt can be achieved.

In both illustrated embodiments, beginning from the axial ends of the central region 1, the wall thickness of the roll shell 3 decreases toward the ends of the roll shell 3.

However, the wall thickness does not fall below a minimum wall thickness ($s_{min}$). The wall thickness (s) between the maximum wall thickness ($s_{max}$) at the end of the central region 1 and the minimum wall thickness ($s_{min}$) is at most $$(x/x^*)^2 \cdot s_{max},$$

where x is the distance between the point to be considered, having the wall thickness s and the end of the roll shell 3, x* is the distance between the end of the central region 1 and the end of the roll shell 3, $s_{max}$ is the maximum wall thickness.

In both embodiments, the roll shell 3 may be comprised of a fiber reinforced plastic. In order to reduce the degree of reinforcement from the outer end of the central region 1 toward the axial ends of the roll shell 3, the angle of the wound on fibers in relation to the circumferential direction is increased, as seen from the ends of the roll shell 3 toward the central region 1. The roll carrier 2 is comprised of metal and, in order to reduce its weight, it may be in the form of a tube.

The roll shown in FIG. 2 includes a roll shell 3 which is rotatably mounted on the roll carrier 2 in the central region 1 via two axially separated bearings. In addition, beginning from the axial ends of the central region, the wall thickness s of the roll shell 3 decreases continuously toward the ends of the roll shell 3.

In contrast, the roll shell 3 in the embodiment of FIG. 1 has its central region 1 mechanically firmly connected to the roll carrier 2. The roll carrier 2 is rotatably mounted in a roll frame, not illustrated. Beginning from the axial ends of the central region 1, the wall thickness s of the roll shell 3 decreases toward the ends of the roll shell 3 only in a transition region 4. Beyond this, the wall thickness s remains constant at a minimum value.

In FIG. 1, the roll shell 3 supports a flexible covering 5 between the roll carrier and the roll shell, which protects the interior of the shell against contamination.

In addition, the ends of the roll shell 3 can be guided in relation to the roll carrier 2, so that only a specific radial direction of movement is possible between the roll shell 3 and roll carrier 2. Moreover, it is possible to arrange supporting elements, and preferably hydraulic supporting elements, between the axial ends of the roll shell 3 and the roll carrier 2. These elements influence the bending behavior of the roll shell 3 in relation to the roll carrier 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roll for supporting an object to be supported and/or guided while wrapped partially circumferentially around the roll, the roll comprising:

a continuous roll carrier having an axially central region and opposite axial end regions;

a roll shell around the roll carrier and also having an axially central region; the carrier and roll shell being respectively shaped so that the carrier within the roll shell supports the roll shell in a radial direction only in the axially central regions of the carrier and the roll shell;

the roll shell having axial ends and axially outward regions axially outward of the central region toward the ends of the shell, where the roll shell and the carrier are respectively so shaped and sized as to provide radial spacing between the roll shell and the roll carrier for allowing the roll shell to bend in relation to the roll carrier;

the roll shell having a rigidity characteristic along its axial length wherein the rigidity of the roll shell is higher at the central region and the rigidity of the roll shell decreases axially outward from the central region toward the axial ends of the roll shell in a manner such that loading of the roll shell due to the dead weight of the roll shell and due to external loading on the roll shell from what is guided by the roll shell causes curvature of the bending line of the roll shell over the axial length of the roll shell.

2. The roll of claim 1, wherein the rigidity of the roll shell decreases axially outward in a manner for keeping the bending of the roll shell in a substantially constant manner from the central region to the axial ends of the roll shell.

3. The roll of claim 1, wherein the roll shell comprises a wall with a radial direction wall thickness and the thickness of the roll shell gradually decreases from the central region axially outwardly to the ends thereof.

4. The roll of claim 3, wherein the decrease in thickness of the roll shell is preferably continuous from the central region axially toward the ends of the roll.

5. The roll of claim 1, wherein the wall thickness of the roll shell decreases axially outwardly of the central region and toward the end of the roll tube over a transition region that is less than the entire length of the distance from the central region to the end region of the roll.

6. The roll of claim 5, wherein the transition region begins at the roll shell central region and extends only part of the distance outward to the ends of the roll.

7. The roll of claim 6, wherein the wall thickness of the roll shell decreases continuously outwardly from the central region over the transition region.

8. The roll of claim 6, wherein the wall thickness of the roll shell is constant from the transition region outward to the ends of the roll shell.

9. The roll of claim 8, wherein the wall thickness of the roll shell decreases continuously outwardly from the central region to the transition region.

10. The roll of claim 3, wherein the wall thickness of the roll shell decreases from the axial ends of the central region axially outwardly toward the ends of the roll shell, wherein the wall thickness does not fall below a minimum wall thickness ($s_{min}$), and the wall thickness (s) between maximum wall thickness ($s_{max}$) at the end of the central region and the minimum wall thickness ($s_{min}$) is at most $$(x/x^*)^2 \cdot s_{max},$$

where x is the distance between the point to be considered, having the wall thickness s, and the end of the roll shell, x* is the distance between the end of the central region and the end of the roll shell, $s_{max}$ is the maximum wall thickness.

11. The roll of claim 1, wherein the roll shell includes materials which influence the rigidity of the roll shell.

12. The roll of claim 11, wherein the roll shell comprises plastic containing rigidity influencing reinforcement parts.

13. The roll of claim 12, wherein the reinforcement parts are selected from the group consisting of fibers and woven fabrics.

14. The roll of claim 2, wherein the roll shell is comprised of plastic.

15. The roll of claim 14, wherein the roll shell is shaped and of such material that the degree of reinforcement of the roll shell decreases in the axial direction outwardly from the axial ends of the central region toward the ends of the roll shell.

16. The roll of claim 1, wherein in the central regions, the roll shell is mechanically firmly connected to the roll carrier and the roll carrier is rotatable with the roll shell.

17. The roll of claim 1, wherein in the central regions, there is a rolling bearing connection between the roll shell and the roll carrier, whereby the roll shell is rotatable around and with respect to the roll carrier.

18. the roll of claim 1, wherein the end regions between the roll carrier and the roll shell are open and a flexible covering is disposed over the open end regions for closing the open end regions between the roll shell and the roll carrier.

19. The roll of claim 1, wherein in the central regions, the roll shell is rotatably mounted on the roll carrier.

* * * * *